US008186583B1

(12) United States Patent
McGhie et al.

(10) Patent No.: US 8,186,583 B1
(45) Date of Patent: *May 29, 2012

(54) STOREFRONT PURCHASES UTILIZING NON-NEGOTIABLE CREDITS

(76) Inventors: Sean I. McGhie, Boca Raton, FL (US); Brian K. Buchheit, Davie, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/359,120

(22) Filed: Jan. 26, 2012

Related U.S. Application Data

(63) Continuation of application No. 11/420,255, filed on May 25, 2006, now Pat. No. 7,703,673.

(51) Int. Cl.
*G06K 5/00* (2006.01)
(52) U.S. Cl. ......... 235/380; 235/375; 235/379; 235/487
(58) Field of Classification Search .................. 235/380, 235/375, 379, 487, 486, 382
See application file for complete search history.

(56) References Cited

U.S. PATENT DOCUMENTS

| 4,607,155 | A | 8/1986 | Nao |
|---|---|---|---|
| 5,290,033 | A | 3/1994 | Bittner |
| 5,397,125 | A | 3/1995 | Adams |
| 5,564,546 | A | 10/1996 | Molbak |
| 5,609,337 | A | 3/1997 | Clapper |
| 5,635,696 | A | 6/1997 | Dabrowski |
| 5,674,128 | A | 10/1997 | Holch |
| 5,689,100 | A | 11/1997 | Carrithers |
| 5,761,647 | A | 6/1998 | Boushy |
| 5,774,870 | A | 6/1998 | Storey |
| 5,779,549 | A | 7/1998 | Walker |
| 5,823,874 | A | 10/1998 | Adams |
| 5,919,091 | A | 7/1999 | Bell |
| 5,935,000 | A | 8/1999 | Sanchez, III |
| 5,941,771 | A | 8/1999 | Haste, III |
| 5,943,241 | A | 8/1999 | Nichols |
| 5,949,042 | A | 9/1999 | Dietz |
| 5,980,385 | A | 11/1999 | Clapper |
| 5,993,316 | A | 11/1999 | Coyle |
| 6,003,013 | A | 12/1999 | Boushy |
| 6,015,344 | A | 1/2000 | Kelly |
| 6,048,269 | A | 4/2000 | Burns |
| 6,098,837 | A | 8/2000 | Izawa |
| 6,178,408 | B1 | 1/2001 | Copple |
| 6,280,326 | B1 | 8/2001 | Saunders |
| 6,280,328 | B1 | 8/2001 | Holch |

(Continued)

FOREIGN PATENT DOCUMENTS

WO W09215174 A1 3/1992

*Primary Examiner* — Edwyn Labaze
(74) *Attorney, Agent, or Firm* — Patents on Demand, P.A.; Brian K. Buchheit; Scott M. Garrett

(57) ABSTRACT

A conversion of a quantity of non-negotiable credits to a quantity of negotiable funds can be initiated for a storefront purchase. The non-negotiable credits can be earned from previous interactions with an entity. The converting can be performed by a different legal entity than the entity. The storefront purchase can be completed, during which at least a portion of the non-negotiable credits are expended. The vender providing a good or service for the storefront purchase may not directly honor the non-negotiable credits in absence of the converting. Responsive to the conversion and the completing of the storefront purchase, the good or service can be provided to a purchaser and the quantity of negotiable funds for the storefront purchase can be provided to the vender.

44 Claims, 5 Drawing Sheets

U.S. PATENT DOCUMENTS

| | | |
|---|---|---|
| 6,289,261 B1 | 9/2001 | Hiedel |
| 6,293,867 B1 | 9/2001 | Heidel |
| 6,306,035 B1 | 10/2001 | Kelly |
| 6,311,976 B1 | 11/2001 | Yoseloff |
| 6,315,665 B1 | 11/2001 | Faith |
| 6,332,099 B1 | 12/2001 | Heidel |
| 6,352,175 B2 | 3/2002 | Izawa |
| 6,394,907 B1 | 5/2002 | Rowe |
| 6,533,664 B1 | 3/2003 | Crumby |
| 6,554,705 B1 | 4/2003 | Cumbers |
| 6,645,077 B2 | 11/2003 | Rowe |
| 6,648,755 B1 | 11/2003 | Luciano, Jr. |
| 6,685,559 B2 | 2/2004 | Luciano |
| 6,915,271 B1 * | 7/2005 | Meyer et al. ............. 705/14.35 |
| 7,134,959 B2 | 11/2006 | Penrice |
| 7,200,571 B1 | 4/2007 | Jenniges |
| 2001/0044337 A1 | 11/2001 | Rowe |
| 2001/0054003 A1 | 12/2001 | Chien |
| 2002/0020965 A1 | 2/2002 | Potter |
| 2002/0111210 A1 | 8/2002 | Luciano, Jr. |
| 2002/0169021 A1 | 11/2002 | Urie |
| 2002/0198043 A1 | 12/2002 | Chowdhury |
| 2006/0046827 A1 | 3/2006 | Saffari |
| 2006/0052150 A1 | 3/2006 | Hedrick |
| 2007/0167218 A1 | 7/2007 | Rothschild |
| 2007/0168266 A1 * | 7/2007 | Questembert ............. 705/35 |

* cited by examiner

STOREFRONT PURCHASES UTILIZING NON-NEGOTIABLE CREDITS

CROSS-REFERENCE TO RELATED APPLICATIONS

This continuation application claims the benefit of U.S. patent application Ser. No. 12/759,506 filed entitled "Storefront Purchases Utilizing Non-Negotiable Credits Earned from a Game of Chance", which claims the benefit of U.S. patent application Ser. No. 11/420,255 filed 25 May 2006 entitled "Web Based Conversion of Non-Negotiable Credits Associated with an Entity to Entity Independent Negotiable Funds" and U.S. patent application Ser. No. 12/720,743 filed 10 Mar. 2010 entitled "Conversion of Non-Negotiable Credits Earned from a Game of Chance to Negotiable Funds". The entire contents of U.S. application Ser. No. 11/420,255, U.S. application Ser. No. 12/720,743, and U.S. application Ser. No. 12/759,506 are incorporated by reference herein.

BACKGROUND

The present invention relates to the field of purchasing and, more particularly, to storefront purchases using non-negotiable credits.

In many instances, entertainment districts often include venues such as casinos, concert halls, mini-malls, and retail storefronts in close proximity to one another. These venues offer patrons a large variety of entertainment options and activities. Many times, patrons visit casinos to gamble in hopes of earning "expendable" income, which can be used to enhance activities at various venues. For instance, when a patron earns funds from a game of chance in a casino, they may buy clothing items from an "upscale" retail store which they would not normally purchase.

Casinos require patrons to play games of chance with casino determined entertainment credits such as casino tokens and chips. When patrons earn winnings, winnings are in the form of these entertainment credits. These credits can have no value outside the casino and cannot be used for purchases outside the casino. Thus, to perform purchases outside the casino with winnings, frequently patrons are required to "cash out" to change entertainment credits (e.g., casino tokens) earned from the game of chance to currency (e.g., paper money).

This cash out procedure can be problematic for some patrons who may not wish to carry cash on their person for security reasons, especially when earnings can be large sums. Further, the cash out procedure forces patrons to stop interacting in a game of chance and convert the earnings into money. In many instances, patrons convert all earnings into currency which eliminates all the entertainment credits possessed by the patron. When a patron leaves the casino to make a purchase and returns to the casino to gamble, the patron must obtain entertainment credits again. This can often times be a hassle for patrons which can result in their decreased interest in gaming. As such, it would be beneficial if entertainment credits value would persist from venue to venue.

DETAILED DESCRIPTION

Figure 1:
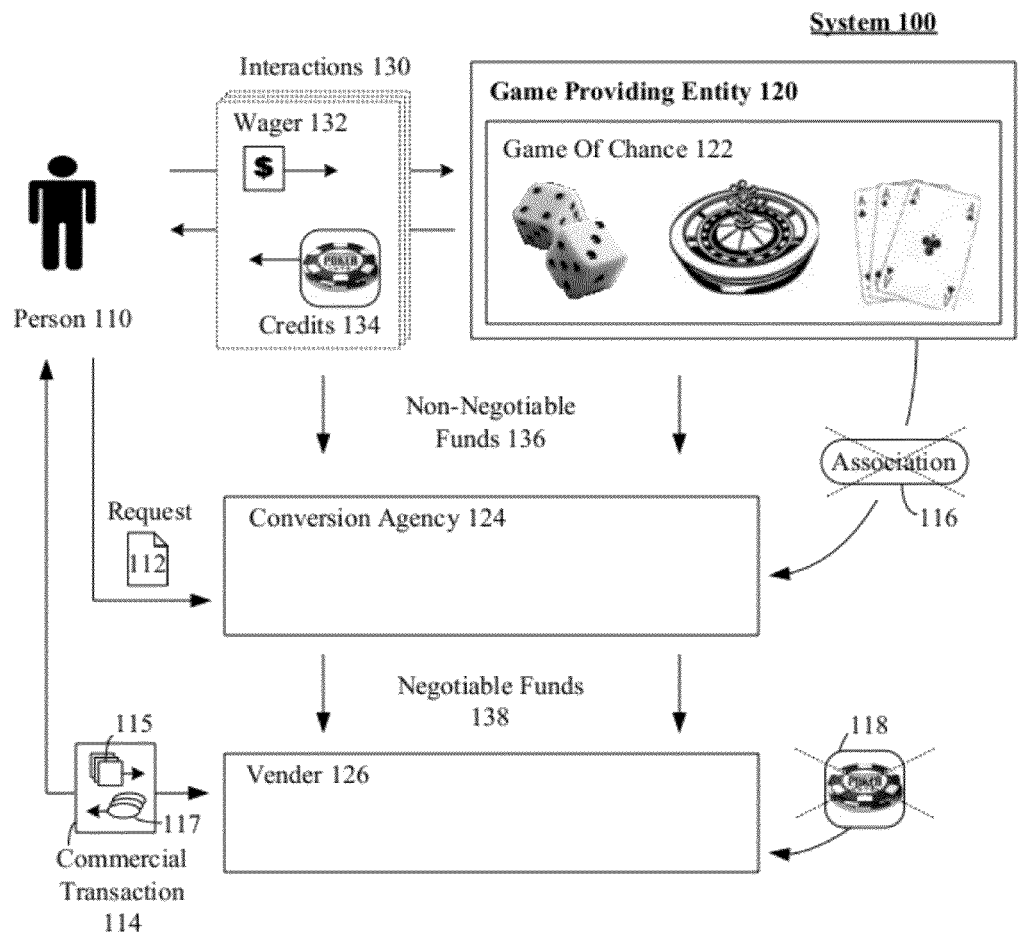
FIG. 1 is a diagram of a system in which non-negotiable funds earned from a game of chance are converted into negotiable funds in accordance with an embodiment of the inventive arrangements disclosed herein.
Figure 1:
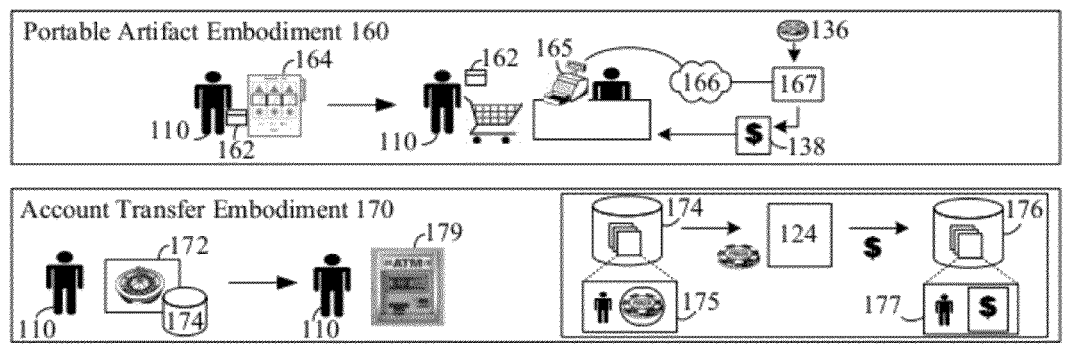

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction handling system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction handling system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to the figures, FIG. 1 is a diagram of a system 100 in which non-negotiable funds 136 earned from a game of chance 122 are converted into negotiable funds 138 in accordance with an embodiment of the inventive arrangements disclosed herein. The non-negotiable funds 136 can be used during a storefront commercial transaction 114 to receive goods/services from a vender 126. In one embodiment, multiple interactions 130 can occur between a person 110 and a game providing entity 120, in which the person 110 plays a game of chance 122. During each interaction 130, an optional wager 132 can be made. With each successful outcome of the game of chance 122, person 110 can receive entertainment credits 134. With each non-successful outcome of the game of chance 122, the person 110 can lose their wager 132 (if one is made).

The entertainment credits 134 are non-negotiable funds 136. These funds 136 (e.g., the entertainment credits 134) may not be redeemable on an open market. For example, vender 126 will not accept 118 the entertainment credits 134 for commercial transactions 114. A conversion agency 124, which is not directly associated 116 with the game providing entity 120 can convert the non-negotiable funds 136 (which can be a quantity of entertainment credits 134) into negotiable funds 138. This conversion can occur in response to a request 112 by person 110. The request 112 can be explicit or implied. For example, a person can provide vender 126 with the non-negotiable funds 136, which causes the vender 126 to convey funds 136 to the conversion agency 124 and receive negotiable funds 138 in return. Thus, a sequence of events between the request 112, commercial transaction 114, conversion agency 124, vender 126, and person 110 can be altered and still be considered within scope of the disclosure. Further, delays can be introduced in the fund conversion process (between funds 136 and 138), as can different types of fund-based transactions, such as loans, pre-payment, post-payments, and the like. For example, conversion agency 124 can advance the vender 126 a quantity of negotiable funds 138, which is legally considered a loan made by the conversion agency 124 to the person 110. The game providing entity 120 can repay the loan to the conversion agency 124 for the person 110.

Person 110 can conduct a commercial transaction 114 with vender 126. During the transaction 114, the person 110 can specify a user-selected set of requests 115 for goods and/or services 117 of the vender 126. The goods and/or services 117 can cost a quantity of negotiable funds 138, which are provided to the vender 126. In one embodiment, the negotiable funds 138 can be provided directly to the vender 126 by the conversion agency 124. In another, the negotiable funds 138 can be provided by the conversion agency 124 to person 110, who provides these funds 138 to the vender 126.

Numerous embodiments exist for conducting the conversions as described herein, a few of which are shown as embodiments 160 and 170. Embodiment 160 shows a portable artifact embodiment, where a person 110 stores entertainment credits 134 from the game of chance 122 upon a portable artifact 162, which can be a physical card with a magnetic strip, a RFID storage device, a flash memory card, a paper voucher, or other tangible artifact able to store digitally encoded (analog encoded, or even paper encoded or written) data. Machines 164 upon which the games of chance 122 are played can include a reader/writer able to alter content stored on the portable artifact 162. In one embodiment, the "writer" can print vouchers to paper. The reader/writer need not be integrated into the machine 164, but can be a separate machine, in one embodiment of the disclosure.

In one configuration, wagers 132 can be made from value stored on the artifact 162 and earnings (e.g., credits 134) can be recorded on the artifact 162. The person 110 can thereafter shop at a storefront of vender 126 and present a cashier 164 with the artifact 162. A cash register 165 used by the cashier 164 can be connected to a network 166. The conversion agency 124 can have a network element 168 connected to the network 166, which converts non-negotiable funds 136 on the artifact 162 into a quantity of negotiable funds 138 needed to complete the commercial transaction 114 conducted via the register 165 and cashier 164. From the perspective of the vender 126, the transaction 114 conducted via the register 165 is a "standard" transaction that results in the vender 126 receiving suitable negotiable funds 138 for providing the goods/services 117 to person 110. In another embodiment, a "non-standard" transaction can occur, which involves the vender 126 performing an additional set of one or more steps to explicitly convert the non-negotiable funds 136 to negotiable funds 138.

Embodiment 170 shows an account transfer embodiment 170, where a person 110 plays a game of chance 122. Earnings (e.g., 134, 136) from the game of chance 122 are recorded within a tangible data store 174 associated with the game providing entity 120. This data store 174 can include an account 175 for the person 110, which tracks an amount of entertainment credits 134, which are non-negotiable funds 136, of the person 110. Conversion agency 124 can directly access the account 175 of data store 174 and can convert a quantity of credits 134 into negotiable funds 138, which are recorded in a tangible data store 176 that is not directly associated with entity 120. The data store 176 can include an account 177 for the person 110, which contains an amount of negotiable funds 138, of the person 110. A person 110 can conduct commercial transactions 114 via a machine 179, such as a kiosk, an ATM machine, etc., which involve funds of account 177 changing. In one embodiment, the goods/services 117 received from person 110 in embodiment 170 can include cash (such as from an ATM machine). This cash can be an amount of cash-back received during transaction 114, can be the transaction 114, itself and may involve a transaction fee, which is extracted from account 177 by machine 179.

The embodiments 160, 170 are for illustrative purposes only and are not intended to be (or to be construed as being) exhaustive or comprehensive. For example, any combinations of the embodiments 160, 170 are to be considered within scope of the disclosure. In a contemplated configuration, entertainment credits earned via machine 164 and placed on artifact 162 (per embodiment 160), which can be placed in a machine 179, such as an ATM (per embodiment 170) to extract funds 138, which are converted (by agency 124) from the credits 134 stored on artifact 162.

In one embodiment, the conversion agency 124 can be compensated (e.g., charge a processing fee) for converting the non-negotiable funds 136 to negotiable funds 138. This fee can be paid to conversion agency 124 by the game providing entity 120, the person 110, and/or by the vender 126.

As used herein, a game of chance 122 can be a game in which an outcome is at least partially determined by random variables rather than strictly by strategy. There can be a level of "skill" or strategy involved in a game of chance 122, which can increase a person's 110 odds of a positive outcome. Common devices used in a game of chance 122 to add a significant random variable include dice, spinning tops, playing cards, roulette wheels, numbered balls drawn from a container, use of a computer or machine generated random number, and the like. Games of chance can also involve betting on an outcome of sports events and other such competitive games having an uncertain outcome.

Many (but not all) games of chance 122 are designed so that statistical odds favor the "house" or the game providing entity 120. That is, statistically, a large set of interactions 130 involving wagers 132 and credits 134 (assuming for the moment that the wagers 132 are credit 134 based wagers) will result in a net gain of credits 134 to the game providing entity 120 receiving more credits 134 (as wagers 132) than they provide (as winnings) over a relatively large set of interactions 130. Stated differently, a game of chance 122 can have mathematically-determined odds that ensure the house (e.g., game providing entity 120) has at all times an advantage over the players (e.g., person 110). This can be expressed more precisely by the notion of expected value, which is uniformly negative (from the player's (person 110) perspective). This advantage is called the house edge. In games of chance 120 such as poker where players (110) play against each other, the house (entity 120) takes a commission called the rake.

A game of chance 122 does not necessarily involve a wager 132, though it may. For example, sweepstakes are a type of a game of chance 122, which may (e.g., lottery) or may not (e.g., promotional sweepstakes) involve a wager 132. A promotional sweepstakes can be a marketing promotion targeted towards both generating enthusiasm and providing incentive reactions among customers by enticing consumers to submit free entries into drawings of chance that are tied to product or service awareness wherein the featured prizes are given away by sponsoring companies.

A game of chance 122 is defined herein to include any type of gambling game or event. In many jurisdictions, local as well as national, gambling (e.g., games of chance 122) are banned, heavily controlled by licensing, and/or are subject to government regulations and restrictions. Under US federal law, gambling is legal in the United States, and states are free to regulate or prohibit the practice. Thus, any event of uncertain outcome that is subject to state (or federal) regulations under a gambling statute is to be considered a game of chance 122 and within scope of the inventive arrangements (and claims) detailed herein. Because American Indian reservations are considered federally granted lands not subject to state regulation in the same way as other lands, many reservations geographically located in states that prohibit gambling (e.g., games of chance 122) are permitted to provide these games of chance 122, since the lands are not subject to state gambling laws. Similarly, cruise ships that travel outside state jurisdictions, often permit gambling (considered a game of chance 122 for purpose of the claims/disclosure) once the ships are located in international waters.

Games of chance 122 can involve a variety of machines (e.g., 164, 172). In many instances regulations (typically under state gambling statutes) can impose that odds in these gaming devices be statistically random, which helps to prevent manufacturers from making some high-payoff results impossible.

Games of chance 122 can include, but are not limited to, the following types of gambling: casino games, table games, fixed odd betting, pari-mutuel betting, sports betting, and the like. Specific games of chance 122 include, but are not limited to, Craps, Roulette, Baccarat, Blackjack, Poker, Pachinko, slot machines, Video poker, Bingo, Keno, dead pool, lotteries, pull-tab games and scratch cards, Mahjong, card games (e.g., Liar's poker, Bridge, Basset, Lansquenet, Piquet, Put, Teen Patti), carnival games (e.g., The Razzle or Hanky Pank), coin tossing games (e.g., Head and Tail, Two-up), confidence tricks (e.g., Three-card Monte or the Shell game), dice-based games (e.g., Backgammon, Liar's dice, Passe-dix, Hazard, Threes, Pig, or Mexico), horse or greyhound racing, sports outcome betting, and the like.

Game providing entities 120 include any entity providing a game of chance 122 to others (person 110), where entertainment credits 134 can be earned. Game providing entities 120 can include casinos, cruise ships, States (for lottery, scratch off games, etc.), churches (running bingo games, for example), race tracks, online gambling site providers, slot-machine houses, carnivals, gambling parlors, companies (for promotional sweepstakes), High Schools (for raffles), and the like.

The wager 132 can be bet in an outcome of winning a game of chance 122. The wager 132 can risk money, previously earned entertainment credits 134 or something of material value on an event with an uncertain outcome with an intent on winning additional money, credits 134, and/or material goods/services. Typically the outcome of a wager 132 is evident within a short period (such as a duration of the game of chance 122). An amount of entertainment credits 134 earned from winning the game of chance 122 can vary in direct proportion to an amount of the wager (or the stake, which is placed at risk against the uncertain outcome.) A wager 132 can have odds associated with it.

Entertainment credits 134 are non-negotiable funds 136 that generally have no value outside of an environment (building, Web site, etc.) of the game providing entity 120. For example, casinos (one embodiment of entity 120) generally utilize casino tokens, chips, or plaques to represent a quantity of entertainment credits 134.

Use of entertainment credits 134, such as casino tokens, can be more convenient than use of negotiable funds 138 for many reasons. For example, use of entertainment credits 134 makes theft and counterfeiting more difficult. Entertainment credits (which when having a physical representation are often a uniform size and weight) can be relatively easy to stack, count, etc. Additionally, studies have proven people (110) gamble more freely (play games of chance 122 with larger wagers 132 and frequency), when entertainment credits 134 than when wagering 132 with cash or other negotiable funds.

Additionally, use of entertainment credits 134, can have legal benefits that can permit entities 120 to conduct games of chance 122, which would be prohibited if negotiable funds 138 were utilized instead of entertainment credits 134. That is, numerous legal statutes and regulations exist that are more restrictive when gambling earnings are in a form of negotiable funds 138. For example, the Unlawful Internet Gambling Enforcement Act (UIGEA) of 2006 prohibits many online gambling activities with negotiable funds 138, which are permitted with certain forms of non-negotiable funds 136. For example, electronic fund transfers via credit cards or debit cards related to gambling winnings are generally prohibited by US banks. Similarly, wire transfers of negotiable funds 138 earned through games of chance 122 are legally prohibited in many instances. Many of these acts explicitly prohibit the transfer of negotiable funds from gambling earnings across state lines Non-negotiable funds 136 can include any of a variety of financial instruments that are not legal currency and not governed under article 3 of the Uniform Commercial Code (UCC). For example, non-negotiable funds 136 can include IOUs issued by the game providing entity 120. In one embodiment, non-negotiable funds 136 can include secured transactions, which take a security interest on collateral owned by the game providing entity's 120 assets, which are subject to Article 9 of the UCC. In one embodiment, the non-negotiable funds 136 can include letters of credit, issued by the game providing entity 120.

Negotiable funds 138 comprise a set of negotiable instruments, which are a specialized type of "contract" for the payment of money that is unconditional and capable of transfer by negotiation. As payment of money is promised later, the instrument itself can be used by the holder in due course frequently as money. Common examples include checks, banknotes (paper money), and commercial paper. Thus, negotiable funds 138 include currency, and instruments covered by Article 3 and 4 of the Uniform Commercial Code. For a writing to be a negotiable instrument under Article 3,[1] the following requirements must be met: 1) The promise or order to pay must be unconditional; 2) The payment must be a specific sum of money, although interest may be added to the sum; 3) The payment must be made on demand or at a definite time; 4) The instrument must not require the person promising payment to perform any act other than paying the money specified; 5) The instrument must be payable to bearer or to order. Additionally, negotiable funds include commercial paper, letters of credit (governed by Article 5 of the UCC), Bills of lading (governed by Article 7 of the UCC), securities (governed under Article 8 of the UCC), and deeds and other documents. One important consideration for many negotiable instruments (funds 138) is that they are payable to a bearer on demand.

The commercial transaction 114 can be one in which wherein the quantity of negotiable funds 138 are applied to user (110) specified (via request 115, for example) purchase of a good or service 117. Stated differently, a commercial transaction can be an economic transaction where person 110 receives a good or a service from vender 126 for value. Commercial transactions 114 can include a sale of goods (117) from a storefront, a Web site, a catalog (mail order), over the phone, and the like. Transaction 114 can also include a payment for a service requested by person 110. Payment of the negotiable funds 138 during the commercial transaction 114 can occur before, after, or concurrent with the receipt (or shipping) of the goods or service 117. A contract (including specifics established by the parties (110 and 126) as well as legal defaults provided by the UCC or applicable common law/state law) between the vender 126 and person 110 established as part of the commercial transaction 114 can determine when payment (funds 138) for the goods/services 117 is due. In one embodiment, commercial transaction 114 can include transaction where currency is provided to person 110 by a vender 126 (a bank as part of an ATM transaction, for example) for a fee. This currency can be provided as a loan or as a withdrawal from an account of person 110, where the account includes the negotiable funds 138.

The conversion agency 124 can be a legal entity that converts non-negotiable funds 136 (including entertainment credits 134) into negotiable funds 138. The conversion agency 124 can lack a direct association 116 with the game providing entity 120. In one embodiment, no legal relationship of enablement of corporate identity (no parent, subsidiary, etc.) relationship can exist between the conversion agency 124 and entity 120. No fiduciary duties under corporate law can exist between agency 124 and game providing entity 120. In one embodiment, agency 124 can be geographically located outside property owned or leased by the game providing entity 120. In another, it can lease space and provide its services from entity 120 owned/leased land. In one embodiment, the conversion agency 124 can support multiple different game providing entities 120, which can be competitors of each other.

In one embodiment, the conversion agency is not a bank or similar financial institution (and may therefore be outside the guidelines established by UIGEA and other statues and regulations, which impose restrictions on banks). In one embodiment, the conversion agency 124 may be located in the same jurisdiction as the game providing entity (possibly to avoid legal entanglements/restrictions with operating in multiple or across jurisdictional boundaries) or may be located in a jurisdiction with favorable rules for performing the fund conversions.

Figure 2:
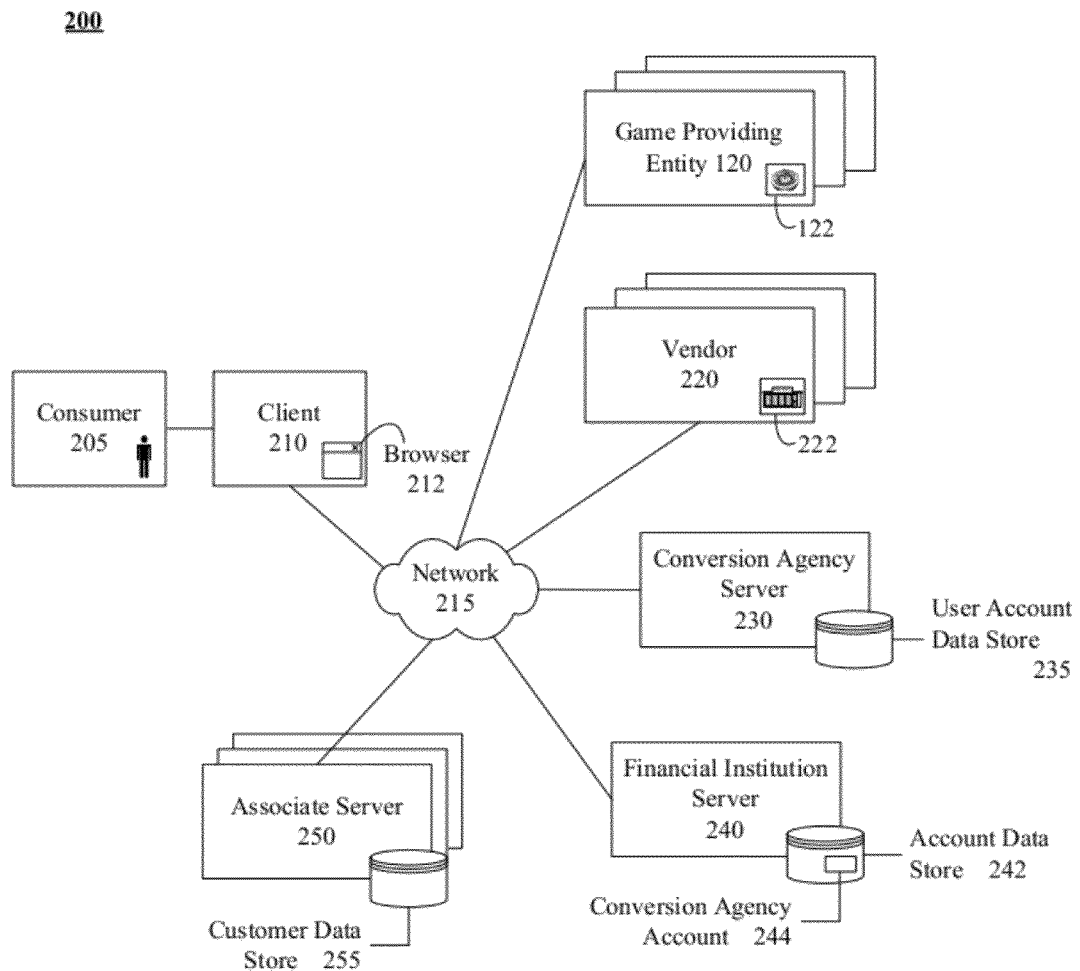
FIG. 2 is a schematic diagram of system for converting non-negotiable credits associated with a game providing entity to negotiable funds in accordance with an embodiment of the inventive arrangements disclosed herein.

FIG. 2 is a schematic diagram of system 200 for converting non-negotiable credits associated with a game providing entity to negotiable funds in accordance with an embodiment of the inventive arrangements disclosed herein. System 200 can represent a specific embodiment of system 100.

In system 200, consumer 205 can interact with a game of chance 122, such as through a game providing entity 120 (e.g., casino). Interactions can occur via a physical interaction with game of chance objects (e.g., dice, playing cards) or via a browser 212, rich internet interface, or other software executing upon client 210. Consumer 205 can purchase goods/services from storefront 222 provided by vender 220. These goods/services can be purchased using negotiable funds that a conversion agency server 230 provides. The conversion agency server 230 can convert entertainment credits resulting from earnings of a game of chance (non-negotiable funds) into the negotiable funds.

Client 210 can be any of a variety of devices including, but not limited to, a personal computer, a kiosk, a telephone, a personal data assistant (PDA), a mobile phone, a slot-machine, an electronic poker game, and the like. Client 210 can include hardware, such as a processor, a memory, and a bus connecting them (as can server 230, 240, and/or 250). The hardware can execute computer program products (software/firmware) that is stored in a non-transitory storage medium. In one embodiment, client 210 can operate in a stand-alone fashion. Alternatively, client 210 can be a device that cooperatively participates in a network of distributed computing devices. Network 215 can facilitate data exchanges over wireless as well as line-based communication pathways and protocols.

In one embodiment, consumer 205 and conversion agency server 230 can interact with associate server 250 and/or financial institution server 240 via network 215. Consumer 205 can interact physically with vender 220 via storefront 222. Conversion agency server 230 includes user account data store 235 in which consumer 205 is a member. Associate server 250 includes customer data store 255 in which consumer 205 is a member. The server 250 can be a server that maintains funds for a club or organization. For example, an entertainment club can require members contribute a membership fee, where the membership fees are maintained by the server 250. Financial institution server 240 includes account data store 242. Account data store 242 includes conversion agency account 244 corresponding to conversion agency 230.

Consumer 205 can earn non-negotiable credits from games of chance provided by game providing entity 120. These earnings (e.g., entertainment credits) can be managed by associate server 250 or consumer 205 (e.g., tokens). The quantity of these non-negotiable credits can be saved in customer data store 255. Consumer 205 (or vender 220) can use conversion agency server 230 to convert the non-negotiable credits from associate server 250 into negotiable funds provided to the vender 220 or financial institution 240. In one embodiment, conversion agency 230 can maintain multiple accounts for the consumer 205. These different accounts can be associated with different game providing entities, and with different types of non-negotiable credits.

For example, consumer 205 can earn five hundred credits from participating in a game of chance provided by game providing entity 120. Consumer 205 can choose to use conversion agency 230 to convert any or all of these credits to a monetary equivalent prior to initiating a purchase at a storefront 222. Conversion agency 230 withdraws the necessary amount from conversion agency account 244 contained within the account data store 242 of financial institution 240 and transfers it to an account specified by consumer 205 (or by vender 220). In another example, consumer 205 uses conversion agency 230 to complete a purchase at storefront 222. Again, conversion agency 230 withdraws the necessary amount from conversion agency account 244 contained within the account data store 242 of financial institution 240 and transfers it to the account of e-commerce server 220.

Vender 220 can provide a checkout system that supports purchases of goods or services with non-negotiable credits provided by consumer 205. In one embodiment, an intermediary financial object, such as a voucher, can be imposed between the entertainment credits (non-negotiable funds) and the negotiable funds that the vender 220 receives. In one embodiment, the intermediary financial object can be restricted to a specific set of one or more venders 220. For example, the intermediary financial object can be a set of credits (e.g., a prepaid card) usable at a specific vender. For purposes of the disclosure, it is unimportant as to whether the optional intermediate financial object is a negotiable instrument or a non-negotiable instrument, and it can be either depending on implementation specifics. Ultimately (regardless of a presence or lack of intermediary artifacts and steps), the vender 220 receives negotiable funds 138 for providing goods/services to the consumer 205 and entertainment credits 134 (non-negotiable funds 136) are used towards the payment for the received goods/services. A commercial transaction (e.g., transaction 114) with the vender 220 can involve the expenditure of entertainment credits in one embodiment. In another, the consumer 205 can be required to expend a mixture of negotiable funds and non-negotiable funds (entertainment credits 134) as payment for the vender 220 provided goods/services.

In one embodiment, vender 220 can include a distinct payment option in a storefront checkout system for conversion agency 230. In one embodiment, this distinct payment option could process the conversion of credits through an interactive kiosk.

Financial institution server 240 can be any of a variety of entities including, but not limited to, a bank, a credit card company, an investment firm, and the like. In one embodiment, financial institution server 240 can reside in the same country as consumer 205 associate server 250, and/or game of chance server 218. In another embodiment, financial institution server 240 can reside in a country other than that of consumer 205 and/or associate server 250.

As shown herein, data stores 255, 235, 242, 176, 174, and the like can be physically implemented within any type of hardware including, but not limited to, a magnetic disk, an optical disk, a semiconductor memory, a digitally encoded plastic memory, a holographic memory, or any other recording medium. Each of the data stores 255, 235, 242, 176, 174 can be stand-alone storage units as well as a storage unit formed from a plurality of physical devices, which may be remotely located from one another. Additionally, information can be stored within each data store 255, 235, 242, 176, 174 in a variety of manners. For example, information can be stored within a database structure or can be stored within one or more files of a file storage system, where each file may or may not be indexed for information searching purposes.

The network 215 can include any hardware/software/firmware necessary to convey digital content encoded within carrier waves. Content can be contained within analog or digital signals and conveyed through data or voice channels and can be conveyed over a personal area network (PAN), a local area network (LAN), or a wide area network (WAN). The network 215 can include local components and data pathways necessary for communications to be exchanged among computing device components and between integrated device components and peripheral devices. The network 215 can also include network equipment, such as routers, data lines, hubs, and intermediary servers which together form a packet-based network, such as the Internet or an intranet. The network 215 can further include circuit-based communication components and mobile communication components, such as telephony switches, modems, cellular communication towers, and the like. The network 215 can include line based and/or wireless communication pathways.

Figure 3:
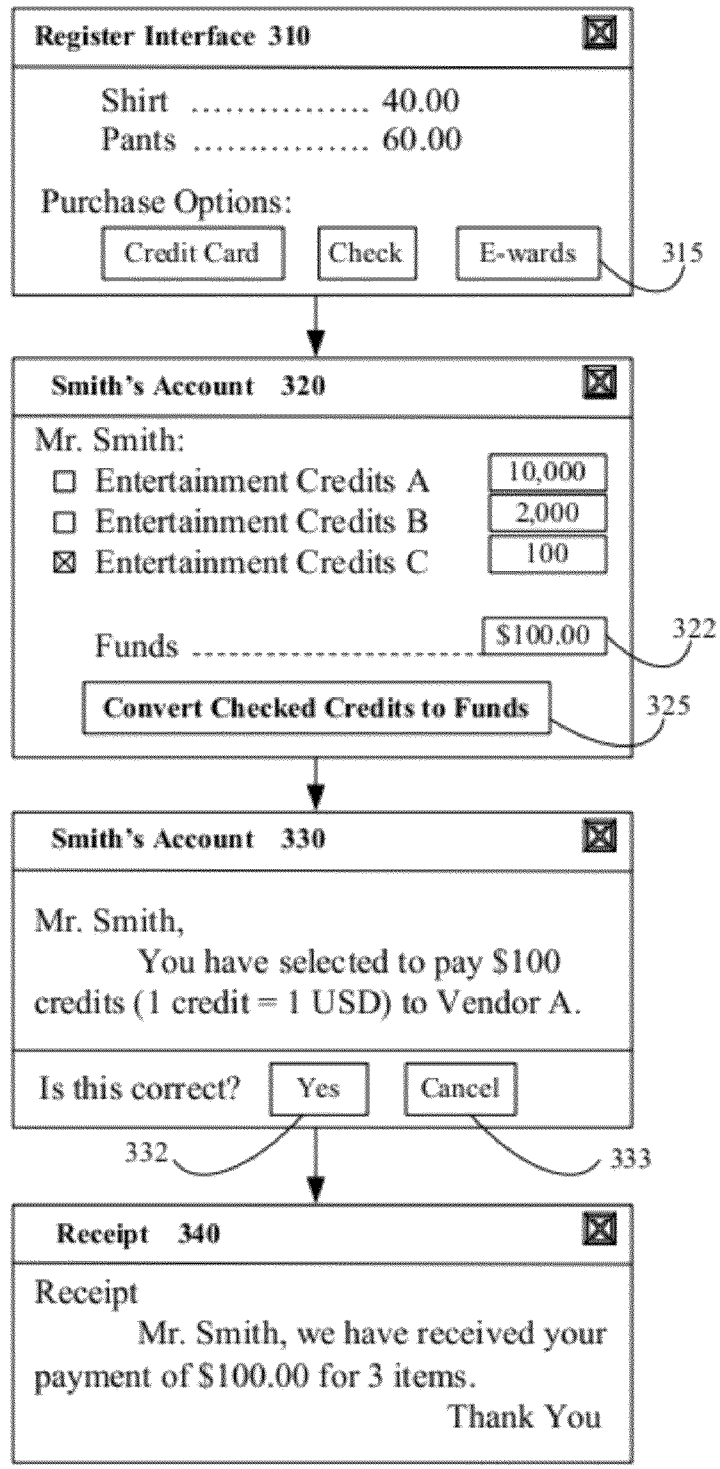
FIG. 3 is a schematic diagram of successive GUIs that illustrate the storefront based conversion of non-negotiable credits associated with an entity earned from a game of chance to entity independent negotiable funds in accordance with an embodiment of the inventive arrangements disclosed herein.

FIG. 3 is a schematic diagram of successive GUIs that illustrate the storefront based conversion of non-negotiable credits associated with an entity to entity independent funds in accordance with an embodiment of the inventive arrangements disclosed herein. The GUIs can be provided on a single machine, or can be provided on a set of two or more devices. For example, the GUIs used to convert entertainment credits to funds (e.g., GUI 320) can be part of a separate device that converts entertainment credits to vender accepted vouchers (instead of to funds 325), where the voucher can be used to complete a storefront purchase.

GUI 302 shows an interface from a checkout system (e.g., checkout register) associated with a storefront 222. A quantity of entertainment credits are earned and can be converted by a conversion agency for use in buying items from a vender 220, who does not accept the entertainment credits.

GUI 310 can be an interface window from checkout register or other storefront check-out device (e.g., a self-service kiosk, for example). GUI 310 includes payment button 315, which represents a payment option that includes the conversion of non-negotiable credits to purchase the items in the shopping cart. Selection of payment button 315 by a user can produce GUI 320.

GUI 320 can be an interface window from a conversion agency. GUI 320 includes display box 322 and button 325. GUI 320 can be rendered by any of a variety of means including, but not limited to, a Web browser, a JAVA applet, a PERL script, and the like. In one embodiment, GUI 320 can be contained within checkout register. GUI 320 can display the balance of non-negotiable, entertainment credits earned from one or more game providing entities. GUI 320 contains a means by which the user selects the type of non-negotiable credits to convert including, but not limited to, a set of radio buttons, a set of checkboxes, a highlighting mechanism, and the like. Display box 322 can display the monetary value of the selected non-negotiable credits. The value displayed in display box 322 can be based on preset conversion factors. Button 325 can represent the initiation of the process by which the selected non-negotiable credits are converted to negotiable funds. Selection of button 325 by a user can produce GUI 330.

GUI 330 can be a display window from a conversion agency. GUI 330 includes yes button 332 and cancel button 333. GUI 330 can be rendered by any of a variety of means including, but not limited to, a Web browser, a JAVA applet, a PERL script, and the like. In one embodiment, GUI 330 can be contained within the checkout register. GUI 330 can display a summary message of the transaction initiated by GUI 320. GUI 330 can include a means to continue the transaction, yes button 332, and a means to cancel the transaction, cancel button 333. Selection of cancel button 333 by a user cancels the transaction and can return the user to GUI 320. Selection of yes button 332 by a user completes the transaction initiated in GUI 320 and can produce GUI 340.

GUI 340 can be a display window from the same said checkout register. GUI 340 can contain a message acknowledging the successful conversion of the user's non-negotiable credits into negotiable funds for the purchase of the items in the shopping cart.

Figure 4:
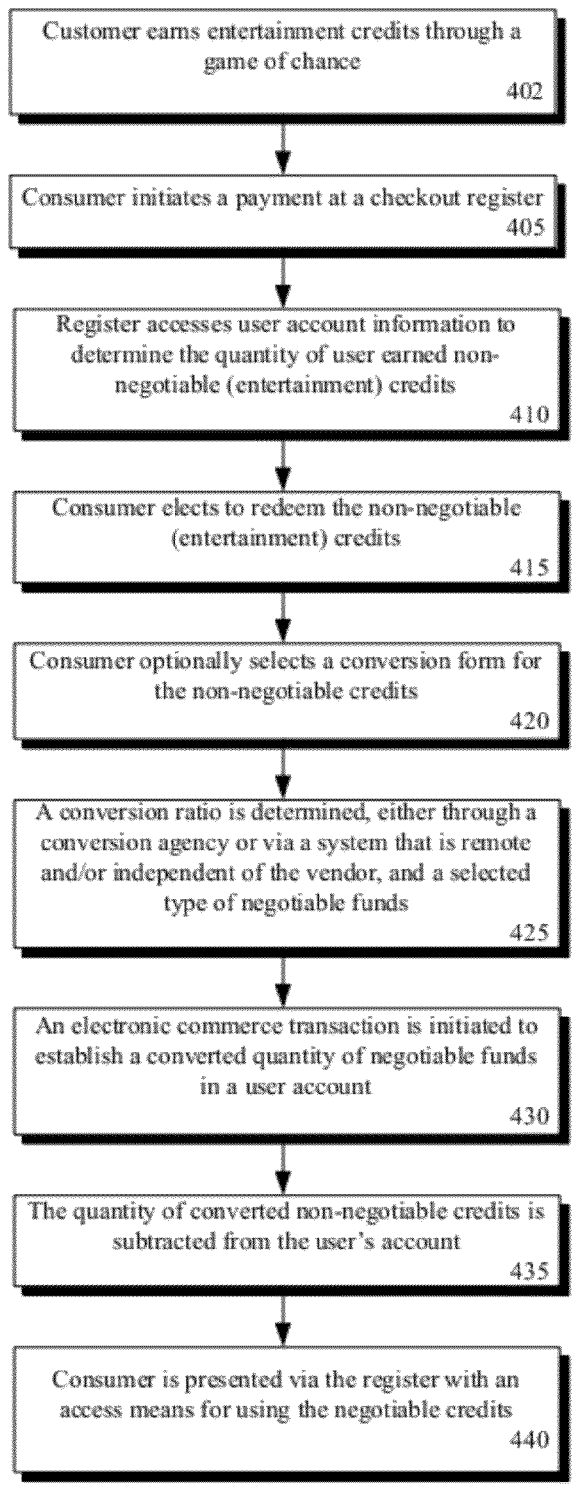
FIG. 4 is a flow chart of a method for the storefront based conversion of non-negotiable, entertainment credits to negotiable funds system in accordance with an embodiment of the inventive arrangements disclosed herein.

FIG. 4 is a flow chart of a method 400 for the storefront based conversion of non-negotiable, entertainment credits to negotiable funds system in accordance with an embodiment of the inventive arrangements disclosed herein.

Method 400 can begin in step 402, where a customer earns entertainment credits through a game of chance. In step 405, the consumer can initiate a payment by utilizing a portable artifact 162. In step 410, user information provided in step 405 to access the consumer's account information can display the amount of non-negotiable credits in the consumer's account. The consumer elects to redeem some quantity of non-negotiable credits in step 415. If supported by the checkout register, step 420 can occur in which the consumer can select the form of negotiable funds to convert the non-negotiable credits. In step 425, a ratio is determined for the conversion of the non-negotiable credits to the selected type of negotiable funds. This ratio can be determined by any of a variety of means including, but not limited to, an algorithm internal to conversion agency, an algorithm contained in a system that is remote and/or independent of the vender, and the like. An electronic commerce transaction is initiated in step 430 to establish the converted amount of negotiable funds in a user account. The quantity of converted non-negotiable credits is subtracted from the user's account in step 435. In step 440, the checkout register presents the consumer with an access means for the negotiable funds.

Figure 5:
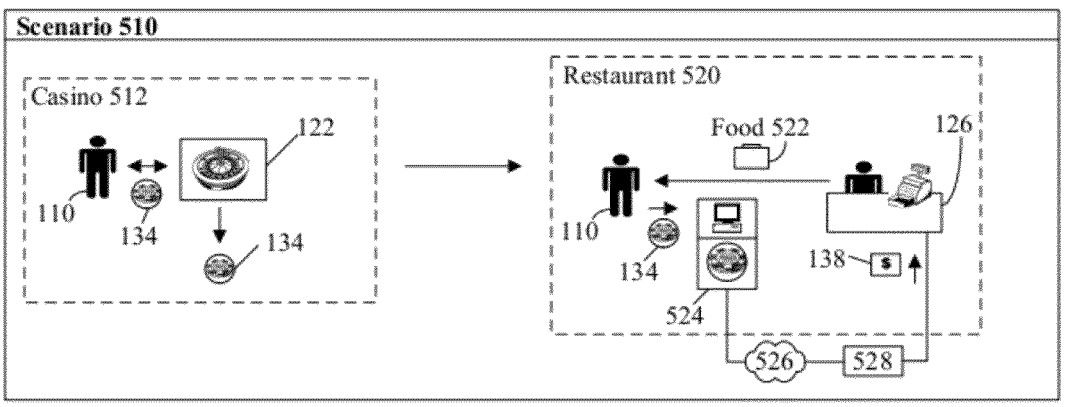
FIG. 5 is a schematic diagram illustrating a set of scenarios for performing a purchase from a vender utilizing non-negotiable credits earned from a game of chance in accordance with an embodiment of inventive arrangements disclosed herein.
Figure 5:
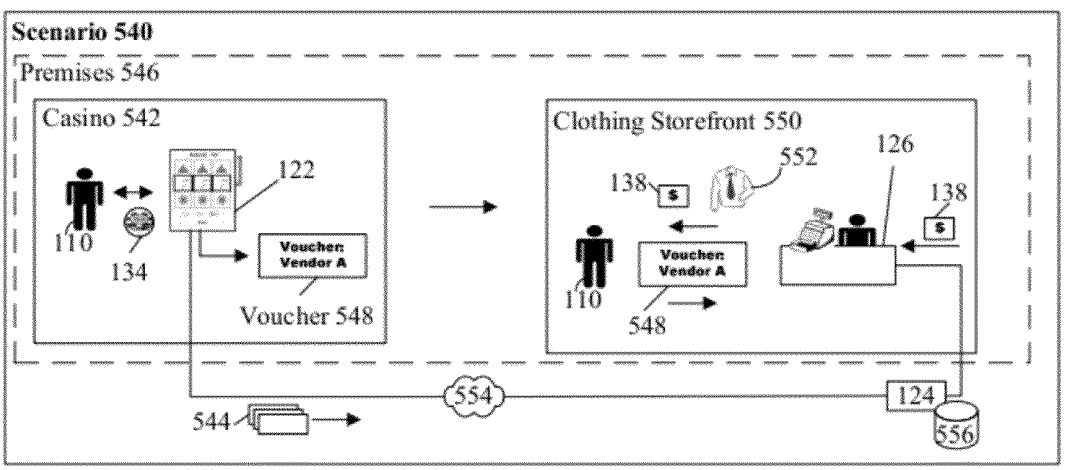
Figure 5:
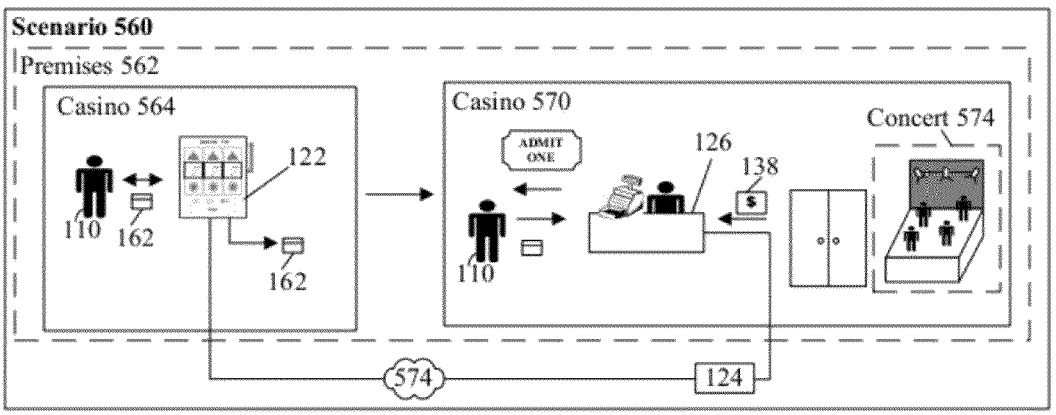

FIG. 5 is a schematic diagram illustrating a set of scenarios 510, 540, 560 for performing a purchase from a vender utilizing non-negotiable credits earned from a game of chance in accordance with an embodiment of inventive arrangements disclosed herein. In FIG. 5, the scenarios 510, 540, 560 can include a person 110 interacting with game of chance 122 to obtain goods and/or services from proximate venders which are independent of casino 512, 554, 564. In scenarios 510, 540, 560, entertainment credits 134 can be utilized to interact with the game of chance 122. Earnings from game of chance 122 can be presented to user in one or more forms of non-negotiable credit. Non-negotiable credit can be used to purchase goods/services from proximate independent vender 126 utilizing credit 134, voucher 138, and/or portable artifact 162.

In scenario 510, vender 126 can be proximately located to casino 512. For instance, casino 512 can be located on a first floor of a building and restaurant 520 can be located on the second floor. Person 110 can interact with a game of chance 122 to obtain entertainment credits 134 which can be casino chips. Person 110 can navigate to restaurant 520 where credits 134 can be used to purchase food 522 from independent vender 126. In one instance, person 110 can utilize machine 524 to perform payment actions associated with the food purchase transaction. That is, person 110 can utilize machine 524 to pay for food 522 using credits 134.

When payment is required for food purchase transaction, the payment information can be communicated to machine 524 from vender 126. For instance, a cash register can electronically communicate with machine 524 to present person 110 with an electronic bill for food purchase. Person 110 can interact with machine 524 to complete the payment for the food purchase transaction. Entertainment credits 134 provided by person 110 can be authenticated by machine 524. In one embodiment, machine 524 can validate credits using one or more traditional industry accounting systems. Once sufficient credits are received, machine 524 can authorize payment for the transaction.

Machine 524 can be communicatively linked to an independent conversion entity 528 via network 526. Based on the amount of credits 134 provided by person 110, negotiable funds 138 can be applied to the food purchase transaction. When person 110 performs payment, credits 134 can be converted into negotiable funds 138 which can be received by vender 126. In one embodiment, entity 528 can be a communicatively linked service provided by an independent organization. In another embodiment, entity 528 can be a software code executing within machine 524 owned and/or licensed from an independent entity.

In premises 540, a clothing storefront 550 can be located proximate to a casino 542 within premises 546. Person 110 can interact with game of chance machine 122 which can result in earnings in the form of a voucher 548 able to be used at clothing storefront 550. Voucher 548 can be generated from a portion of earnings from interaction with game of chance 122. Voucher 548 can be associated with one or more quantities of non-negotiable credits, security information (e.g., bar codes), and the like. For instance, person 110 can choose to "cash out" ten dollars from a fifty dollar earning in the form of a ten dollar voucher 548. Voucher 548 can be generated automatically via one or more mechanisms. In one embodiment, game of chance 122 can be a machine comprising of a user interactive element able to immediately generate a voucher 548. For instance, a slot machine can include a depressible button for generating vouchers from earnings which can be redeemable at a Vender A. In one instance, voucher 548 can be re-used until the quantity of non-negotiable funds associated with the voucher is exhausted. In another embodiment, voucher 548 can be limited to a specific number of uses. For instance, voucher 548 can be a one-time use voucher which can only be valid for a single purchase.

Voucher 548 can be generated utilizing conversion agency 124. In one instance, voucher 544 can convey voucher information 544 to agency 124. In the instance, voucher information 544 can be stored in data store 556 which can be used to validate voucher 548 at time of purchase. When person 110 presents voucher 548 to vender 126, voucher 548 can be verified and negotiable funds 138 can be attributed to purchase. For example, person 110 can present voucher 548 to a vender for the purchase of shirt 552. In one instance, left over non-negotiable credits not required for purchase of shirt 552 can be presented to the person 110. For example, a person 110 purchasing a ten dollar shirt 552 using twenty dollar voucher 548 can receive ten dollars in cash from the vender.

In one instance, machine 122 can present person 110 with a voucher 548 directly corresponding (e.g., one-to-one) to entertainment credits 134 person 110 has earned and/or possesses. In another instance, a casino 524 and/or a clothing storefront 550 determined conversion ratio can be utilized to convert non-negotiable credits associated with a voucher 548 to negotiable funds 138.

In one configuration of the embodiment, voucher 548 can be vender specific. In the configuration, voucher 548 can be redeemable only a user specified vender and/or casino determined vender. In another configuration, voucher 548 can be restricted to use at selected venders.

In scenario 560, a casino 564 can be proximate to casino 570 within premises 562. For example, casino 564, 570 can be competing casinos which can be independently owned. Person 110 can interact with game of chance machine 564 which can result in earnings which can be stored on portable artifact 162 associated with person 110. Earnings can be in the form of non-negotiable credits which can be applied to an account associated with portable artifact 162. Person 110 can navigate to casino 570 and utilize non-negotiable credits associated with artifact 162 to gain admission to an event (e.g., concert 574).

In one instance, artifact 162 can be associated with temporal limitations which can affect redemption of non-negotiable credits. In the instance, artifact 162 can be temporary non-negotiable credits which can be valid for a duration of time. For instance, artifact 162 can include non-negotiable credits which are redeemable for admission prior to concert 574.

It should be appreciated that scenarios 510-560 are for illustrative purposes only and should not be construed to limit the invention in any regard. Different embodiments for conducting purchasing at storefronts utilizing non-negotiable credits are contemplated.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method comprising:
   at least one computing device initiating a storefront purchase with a vender, said storefront purchase being for a good or service;
   at least one computing device, responsive to the initiated storefront purchase, initiating a conversion of a quantity of non-negotiable credits to a quantity of negotiable funds, wherein the non-negotiable credits are earned from previous interactions with an entity, wherein the converting is performed by a different entity than the entity, wherein the different entity is not a subsidiary or parent of the entity, and wherein the different entity is not a subsidiary or parent of the vender;
   at least one computing device completing the storefront purchase, during which at least a portion of the non-negotiable credits are expended, wherein the vender does not directly honor the non-negotiable credits in absence of the converting; and
   at least one computing device, responsive to the conversion and the completing of the storefront purchase, providing the good or service to a purchaser and providing the vender with at least a portion of the quantity of negotiable funds for the storefront purchase.

2. The method of claim 1, further comprising:
   at least one computing device adding the quantity of negotiable funds to an account associated with the at least one vender.

3. The method of claim 1, wherein the storefront is a physical storefront.

4. The method of claim 1, wherein the storefront is an e-commerce storefront.

5. The method of claim 1, wherein the non-negotiable credits are entertainment credits.

6. The method of claim 1, wherein the previous interactions comprises playing a game provided by the entity.

7. The method of claim 1, wherein the non-negotiable credits are from a game of chance.

8. The method of claim 1, wherein the non-negotiable credits are from a gambling game or are from a gambling event.

9. A computer program product comprising:
one or more computer-readable, tangible storage devices;
program instructions, stored on at least one of the one or more storage devices, to initiate a storefront purchase with a vender, said storefront purchase being for a good or service;
program instructions, stored on at least one of the one or more storage devices, to, responsive to the initiated storefront purchase, initiate a conversion of a quantity of non-negotiable credits to a quantity of negotiable funds, wherein the non-negotiable credits are earned from previous interactions with an entity, wherein the converting is performed by a different entity than the entity, and wherein the different entity is not a subsidiary or parent of the entity, and wherein the different entity is not a subsidiary or parent of the vender;
program instructions, stored on at least one of the one or more storage devices, to complete the storefront purchase, during which at least a portion of the non-negotiable credits are expended, wherein the vender does not directly honor the non-negotiable credits in absence of the converting; and
program instructions, stored on at least one of the one or more storage devices, to, responsive to the conversion and completing of the storefront purchase, provide the good or service to a purchaser and providing the vender with at least a portion of the quantity of negotiable funds for the storefront purchase.

10. The computer program product of claim 9, further comprising:
program instructions, stored on at least one of the one or more storage devices, to add the quantity of negotiable funds to an account associated with the at least one vender.

11. The computer program product of claim 9, wherein the storefront is a physical storefront.

12. The computer program product of claim 9, wherein the storefront is an e-commerce storefront.

13. The computer program product of claim 9, wherein the non-negotiable credits are entertainment credits.

14. The computer program product of claim 9, wherein the previous interactions comprises playing a game provided by the entity.

15. The computer program product of claim 9, wherein the non-negotiable credits are from a game of chance.

16. The computer program product of claim 9, wherein the non-negotiable credits are from a gambling game or are from a gambling event.

17. A method comprising:
at least one computing device identifying non-negotiable credits earned through previous interactions with an entity;
at least one computing device, responsive to an initiated storefront purchase for a good or service from a vender, initiating a conversion of a quantity of the non-negotiable credits, wherein for the initiated conversion, a quantity of the non-negotiable credits are converted to a quantity of negotiable funds, wherein the conversion is not performed by the entity or by the vender;
at least one computing device completing the storefront purchase, during which the non-negotiable credits are expended, wherein the vender does not directly honor the non-negotiable credits in absence of conversion actions of the initiated conversion; and
responsive to the conversion and the completing of the storefront purchase, providing the goods or service to a purchaser and providing the vender with at least a portion of the quantity of negotiable funds for the storefront purchase.

18. The method of claim 17, further comprising:
at least one computing device adding the quantity of negotiable funds to an account associated with the at least one vender during the storefront purchase.

19. The method of claim 17, wherein the storefront is a physical storefront.

20. The method of claim 17, wherein the storefront is an e-commerce storefront.

21. The method of claim 17, wherein the non-negotiable credits are entertainment credits.

22. The method of claim 17, wherein the previous interactions comprises the user playing a game provided by the entity.

23. The method of claim 17, wherein the non-negotiable credits are from a game of chance.

24. The method of claim 17, wherein the non-negotiable credits are from a gambling game or are from a gambling event.

25. A computer program product comprising:
one or more computer-readable, tangible storage devices;
program instructions, stored on at least one of the one or more storage devices, to identify non-negotiable credits earned through previous interactions with an entity;
program instructions, stored on at least one of the one or more storage devices, to, responsive to an initiated storefront purchase for a good or service from a vender, initiate a conversion of a quantity of the non-negotiable credits, wherein for the initiated conversion, a quantity of the non-negotiable credits are converted to a quantity of negotiable funds, wherein the conversion is not performed by the entity or by the vender;
program instructions, stored on at least one of the one or more storage devices, to complete the storefront purchase, during which the non-negotiable credits are expended, wherein the vender does not directly honor the non-negotiable credits in absence of conversion actions of the initiated conversion; and
program instructions, stored on at least one of the one or more storage devices, to, responsive to the conversion and completing the storefront purchase, provide the vender with at least a portion of the quantity of negotiable funds for the storefront purchase.

26. The computer program product of claim 25, further comprising:
program instructions, stored on at least one of the one or more storage devices, to provide goods or service to a purchaser responsive to the conversion and completing the storefront purchase.

27. The computer program product of claim 25, wherein the storefront is a physical storefront.

28. The computer program product of claim 25, wherein the storefront is an e-commerce storefront.

29. The computer program product of claim 25, wherein the non-negotiable credits are entertainment credits.

30. The computer program product of claim 25, wherein the previous interactions comprises the user playing a game provided by the entity.

31. A computer system comprising:
one or more processors, one or more computer-readable memories and one or more computer-readable, tangible storage devices;
program instructions, stored on at least one of the one or more storage devices for execution by at least one of the one or more processors via at least one of the one or more memories, to initiate a storefront purchase with a vender, said storefront purchase being for a good or service;
program instructions, stored on at least one of the one or more storage devices for execution by at least one of the one or more processors via at least one of the one or more memories, to, responsive to the initiated storefront purchase, initiate a conversion of a quantity of non-negotiable credits to a quantity of negotiable funds, wherein the non-negotiable credits are earned from previous interactions with an entity, wherein the converting is performed by a different entity than the entity, and wherein the different entity is not a subsidiary or parent of the entity, and wherein the different entity is not a subsidiary or parent of the vender;
program instructions, stored on at least one of the one or more storage devices for execution by at least one of the one or more processors via at least one of the one or more memories, to complete the storefront purchase, during which at least a portion of the non-negotiable credits are expended, wherein the vender does not directly honor the non-negotiable credits in absence of the converting; and
program instructions, stored on at least one of the one or more storage devices for execution by at least one of the one or more processors via at least one of the one or more memories, to responsive to the conversion and completing of the storefront purchase, provide the good or service to a purchaser and providing the vender with at least a portion of the quantity of negotiable funds for the storefront purchase.

32. The computer system of claim 31, further comprising:
program instructions, stored on at least one of the one or more storage devices for execution by at least one of the one or more processors via at least one of the one or more memories, to add the quantity of negotiable funds to an account associated with the at least one vender.

33. The computer system of claim 31, wherein the storefront is a physical storefront.

34. The computer system of claim 31, wherein the storefront is an e-commerce storefront.

35. The computer system of claim 31, wherein the non-negotiable credits are entertainment credits.

36. The computer system of claim 31, wherein the previous interactions comprises playing a game provided by the entity.

37. The computer system of claim 31, wherein the non-negotiable credits are from a game of chance.

38. The computer system of claim 31, wherein the non-negotiable credits are from a gambling game or are from a gambling event.

39. A computer system comprising:
one or more processors, one or more computer-readable memories and one or more computer-readable, tangible storage devices;
program instructions, stored on at least one of the one or more storage devices for execution by at least one of the one or more processors via at least one of the one or more memories, to identify non-negotiable credits earned through previous interactions with an entity;
program instructions, stored on at least one of the one or more storage devices for execution by at least one of the one or more processors via at least one of the one or more memories, to, responsive to an initiated storefront purchase for a good or service from a vender, initiate a conversion of a quantity of the non-negotiable credits, wherein for the initiated conversion, a quantity of the non-negotiable credits are converted to a quantity of negotiable funds, wherein the conversion is not performed by the entity or by the vender;
program instructions, stored on at least one of the one or more storage devices for execution by at least one of the one or more processors via at least one of the one or more memories, to complete the storefront purchase, during which the non-negotiable credits are expended, wherein the vender does not directly honor the non-negotiable credits in absence of conversion actions of the initiated conversion; and
program instructions, stored on at least one of the one or more storage devices for execution by at least one of the one or more processors via at least one of the one or more memories, to, responsive to the conversion and completing the storefront purchase, provide the vender with at least a portion of the quantity of negotiable funds for the storefront purchase.

40. The computer system of claim 39, further comprising:
program instructions, stored on at least one of the one or more storage devices for execution by at least one of the one or more processors via at least one of the one or more memories, to provide goods or service to a purchaser responsive to the conversion and completing the storefront purchase.

41. The computer system of claim 39, wherein the storefront is a physical storefront.

42. The computer system of claim 39, wherein the storefront is an e-commerce storefront.

43. The computer system of claim 39, wherein the non-negotiable credits are entertainment credits.

44. The computer system of claim 39, wherein the previous interactions comprises the user playing a game provided by the entity.

* * * * *

UNITED STATES PATENT AND TRADEMARK OFFICE
CERTIFICATE OF CORRECTION

| | | |
|---|---|---|
| PATENT NO. | : 8,186,583 B1 | Page 1 of 2 |
| APPLICATION NO. | : 13/359120 | |
| DATED | : May 29, 2012 | |
| INVENTOR(S) | : Sean I. McGhie and Brian K. Buchheit | |

It is certified that error appears in the above-identified patent and that said Letters Patent is hereby corrected as shown below:

On the Title Page, Item (63)

In the RELATED TO U.S. APPLICATION DATA the words: "continuation of Application No. 11/420,255, filed on May 25, 2006, now Pat. No. 7,703,673"

should be replaced with: "continuation in part of Application No. 11/420,255, filed on May 25, 2006, now Pat. No. 7,703,673, and a continuation in part of Application No. 12/720,743, filed on March 10, 2010, now Pat. No. 8,123,127, and a continuation of Application No. 12/759,506, filed on April 13, 2010, now Pat. No. 8,162,209, and a continuation in part of Application No. 13/168,814, filed on June 24, 2011, now Pat. No. 8,376,224."

In the Specification

Column 1, Lines 8-20

In the CROSS-REFERENCE TO RELATED APPLICATIONS the words: "This continuation application claims the benefit of U.S. patent application Ser. No. 12/759,506 filed April 13, 2010 entitled "Store-front Purchases Utilizing Non-Negotiable Credits Earned from a Game of Chance", which claims the benefit of U.S. patent application Ser. No. 11/420,255 filed May 25, 2006 entitled "Web Based Conversion of Non-Negotiable Credits Associated with an Entity to Entity Independent Negotiable Funds" and U.S. patent application Ser. No. 12/720,743 filed March 10, 2010 entitled "Conversion of Non-Negotiable Credits Earned from a Game of Chance to Negotiable Funds". The entire contents of U.S. application Ser. No. 11/420,255, U.S. application Ser. No 12/720,743, and U.S. application Ser. No. 12/759,506 are incorporated by reference herein."

should be replaced with: "This continuation application claims the benefit of U.S. patent Ser. No. 11/420,255 filed May 25, 2006 entitled "Web Based Conversion of Non-Negotiable Credits Associated with an Entity to Entity Independent Negotiable Funds", now Pat. No. 7,703,673. Priority Signed and Sealed this
Eighteenth Day of November, 2014

Michelle K. Lee
*Deputy Director of the United States Patent and Trademark Office* to Pat. No. 7,703,673 is through Pat. No. 7,123,127 (filed March 10, 2010 and issued Feb 28, 2012) and/or Pat. No. 8,162,209 (filed April 13, 2010 and issued April 24, 2012) and Pat. No. 8,876,224 (filed June 24, 2011 and issued February 19, 2013, which claims priority to Patent No. 7,703,673 through Pat. No. 7,123,127 and Pat. No. 8,162,209). The application also claims the benefit of patent application 12/759,506 (now Pat. No. 8,162,209). The entire contents of U.S. Application Ser. No. 11/420,255 (now Patent No. 7,703,673), U.S. Application Ser. No. 12/720,743 (now Pat. No. 8,376,224) and U.S. application Ser. No. 12/759,506 (now Pat. No. 8,162,209) are incorporated by reference herein."